(No Model.)

T. S. SMITH & A. M. SHEPARD.
STEAM TRAP.

No. 531,139. Patented Dec. 18, 1894.

Witnesses
J. J. O'Donoho
J. P. Vastine

Inventors
T. S. Smith and
A. M. Shepard.
By their Attorneys
Keeler & Storer

UNITED STATES PATENT OFFICE.

THOMAS S. SMITH, OF EAST ST. LOUIS, ILLINOIS, AND ALFRED M. SHEPARD, OF ST. LOUIS, MISSOURI.

STEAM-TRAP.

SPECIFICATION forming part of Letters Patent No. 531,139, dated December 18, 1894.

Application filed August 13, 1894. Serial No. 520,119. (No model.)

*To all whom it may concern:*

Be it known that we, THOMAS S. SMITH, of East St. Louis, county of St. Clair, State of Illinois, and ALFRED M. SHEPARD, of the city of St. Louis, State of Missouri, have invented certain new and useful Improvements in Steam-Traps, of which the following is a full, clear, and exact description, reference being had to the accompanying drawings, forming a part hereof.

Our invention has relation to improvements in steam traps and consists in the novel arrangement and combination of parts more fully set forth in the specification and pointed out in the claims.

Figure 1:
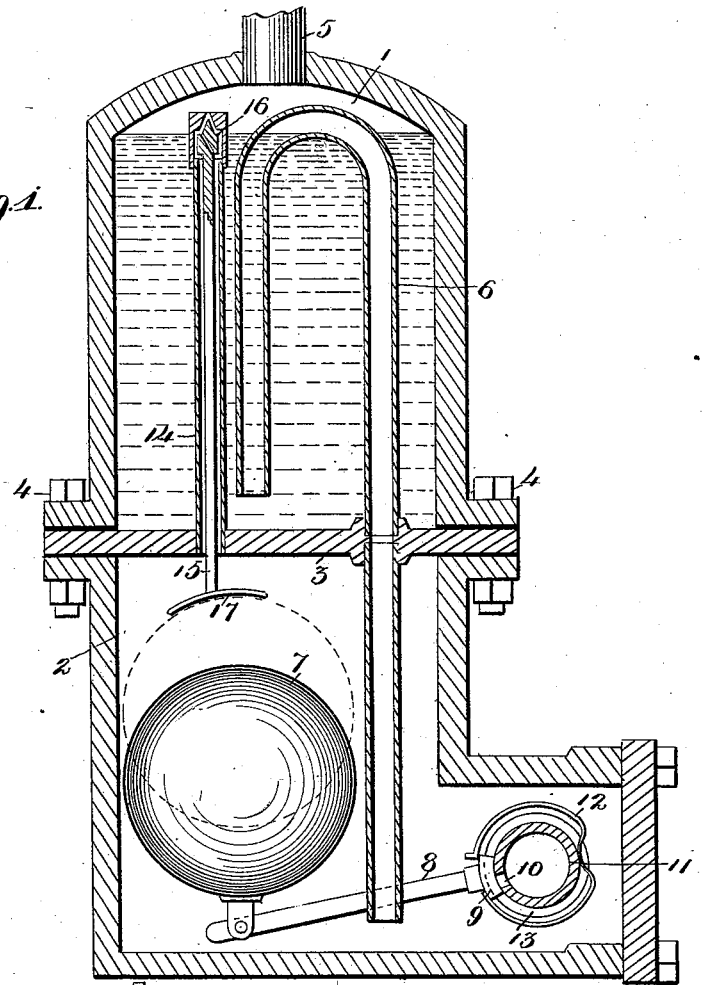
Figure 2:
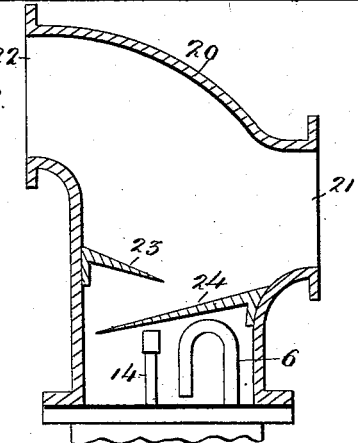

In the drawings, Figure 1 is a middle vertical section of the device, and Fig. 2 is a similar section of a modified form.

The object of our invention is to construct a steam-trap to be placed either in the path of, or at the end of a heating system which will at intervals automatically and effectively discharge the waters of condensation accumulated therein; one whose parts shall be sensitive and responsive to the conditions designed to operate them; one that shall be certain in its actions, cheap and durable, and susceptible of easy attachment to existing heating systems.
To this end our invention consists of a trap which in detail can be described as follows:

Referring to the drawings, 1 represents the receiving chamber of the trap, the same being separated from the discharge chamber 2 by a wall or plate 3, the two chambers being secured to the opposite sides of the plate 3 by bolts and nuts 4 as best seen in Fig. 1. The receiving chamber has an inlet opening for the end of the pipe 5 of the heating system.
Extending upward from near the bottom of the chamber 1 is the short leg of the siphon 6, whose long leg passes through an opening in the plate 3 and terminates near the bottom of the discharge chamber 2. Interposed between the long leg of the siphon and the walls of the discharge chamber 2 is a float 7 pivotally secured to an arm 8 whose free end carries a valve 9 controlling the outlet opening 10 of the discharge pipe 11. A suitable elastic band or spring 12 guided preferably between flanges 13 and whose ends are secured to the valve, keeps the latter in close contact with the outer surface of the pipe whose opening it controls.

From the plate 3, and in communication with the two chambers and immediately over the float 7 extends upwardly into the receiving chamber an equalizing pipe 14 of sufficient inner diameter to admit of the free oscillation of the stem 15, the upper end of which carries a perforated conical valve 16 adapted to close the reduced opening at the upper end or cap of the equalizing pipe. The lower projecting end of the stem 15 carries a striking disk 17 of suitable curvature against which the float is adapted to strike.

The operation of the trap may be described as follows: As the waters of condensation flow into the receiving chamber 1 from the pipe 5, they gradually fill said chamber to the point of overflow of the siphon as indicated in Fig. 1, said water flowing into the chamber 2 and gradually filling the same and lifting the float 7 until it has moved the valve 9 sufficiently past the opening 10 to open the latter. This opening of the valve 9 results in the reduction of steam pressure in said chamber 2; but at the same time the float 7 too has come in contact with the disk 17 and raised it sufficiently to push the stem 15 upward and allowing its valve 16 to close the opening at the top of the equalizing pipe 14. The pressure in the chamber 2 being thus momentarily reduced as stated, and communication being shut off between the two chambers, the excess of pressure in the chamber 1 will force the water from the same through the siphon into the chamber 2, and thence through the opening 10 of the discharge pipe 11, completely flushing the two chambers of their water contents. The float then resumes its normal position, the opening 10 is closed, the stem 15 drops to its original position, communication between the two chambers is restored, and the parts are all in position to repeat the previous operation.

Where the trap is placed in the path of a system instead of at the terminal thereof, we substitute a modified form for the receiving chamber in the shape of a section 20 shown in Fig. 2, the steam passing into the opening 21 and out through the opening 22, any water of condensation running downward along the deflecting plates 23 and 24, to the bottom of the section, the remaining parts being identical with those shown in Fig 1, and already described in detail. These deflecting plates prevent the water from rising and being carried forward by the passing steam in its flow through the system.

The receiving chamber forms a receptacle for dirt, grit, and other foreign substances and prevents the same from coming in contact with or otherwise damaging the working valves. It also becomes a cooling basin wherein the water by degrees loses its caloric and when cooled can be run directly into a sewer without damage to the latter.

Having described our invention, what we claim is—

1. A steam trap comprising two contiguous chambers an equalizing pipe between said chambers, a siphon communication between the two chambers, and a valve in one of the chambers controlled by the proportionate amount of discharge by the siphon, substantially as set forth.

2. A steam trap comprising a receiving chamber and a discharge chamber an equalizing pipe between the chambers, a siphon establishing communication between the chambers, a valve-controlled opening in the discharge chamber, a float operating said valve in proportion to the amount discharged by the siphon into said discharge chamber, substantially as set forth.

3. A steam trap comprising a receiving chamber and a discharge chamber, an equalizing pipe establishing communication between the chambers, a siphon adapted to convey water from one chamber to the other, a valve-controlled discharge opening in the discharge chamber, a float operating said valve and controlling the opening in the equalizing pipe, substantially as set forth.

4. A steam trap comprising a receiving chamber and a discharge chamber, an equalizing pipe establishing communication between the chambers, a stem in said pipe carrying a valve, a disk on the lower end of said stem in the discharge chamber, a siphon for discharging water from the receiving into the discharge chamber, a valve-controlled discharge opening in the discharge chamber, a float operating said valve and adapted to strike the disk on the stem and force the valve thereon to its seat and close the equalizing pipe, substantially as set forth.

5. A steam trap comprising a receiving chamber having a suitable inlet, a discharge chamber located below the same, a plate separating the said chambers, a siphon establishing communication between the chambers, an equalizing pipe between the two chambers, a stem operating within the pipe, a valve on top of said stem, a striking disk at the lower end of the stem located in the discharge chamber, a float in the discharge chamber located below the stem, an arm pivotally secured to the float, a valve at the free end of the arm, a discharge pipe having an opening controlled by said valve leading from the discharge chamber, and a spring encircling the pipe and secured to the valve for holding the latter to its seat, substantially as set forth.

In testimony whereof we affix our signatures in the presence of two witnesses.

THOS. S. SMITH.
ALFRED M. SHEPARD.

Witnesses:
ELMER A. SCHERRER,
CHAS. W. SCHERRER.